(No Model.)
C. F. HEATH.
CAR TRUCK.
No. 548,365. Patented Oct. 22, 1895.
2 Sheets—Sheet 1.
FIG:1.
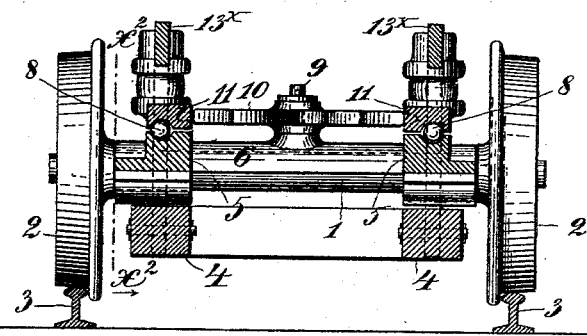
FIG:2.
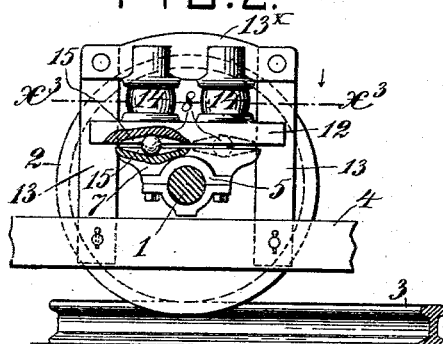
FIG:4.
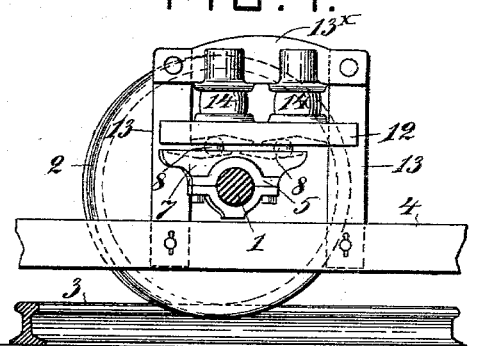
FIG:3.
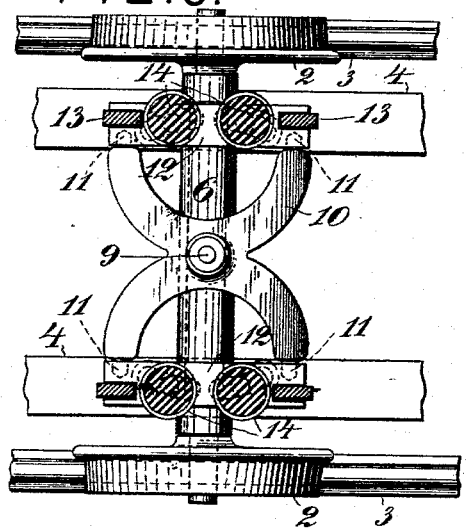
FIG:5.
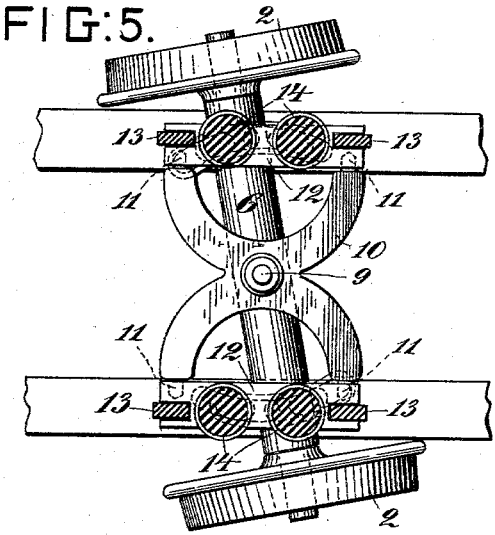
WITNESSES:
F. W. Wiman
Peter A. Ross
INVENTOR:
Charles F. Heath
By Henry Connett
Attorney.

(No Model.) 2 Sheets—Sheet 2.
C. F. HEATH.
CAR TRUCK.
No. 548,365. Patented Oct. 22, 1895.
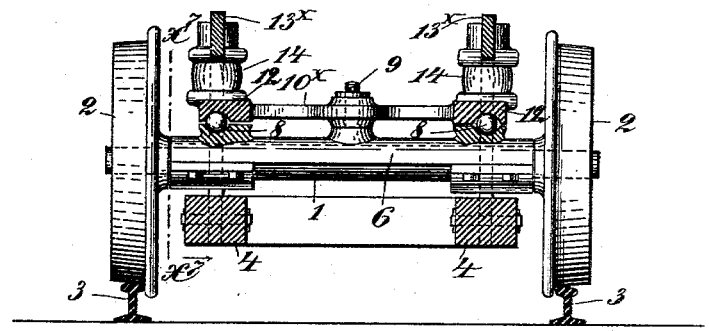
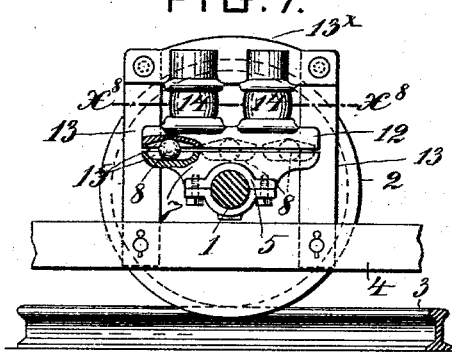
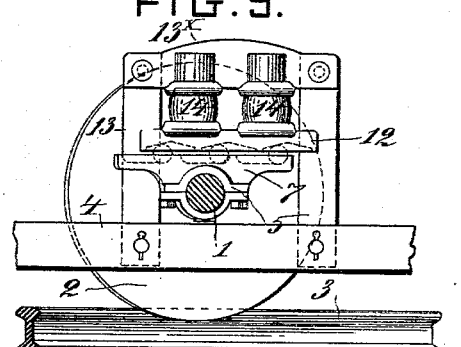
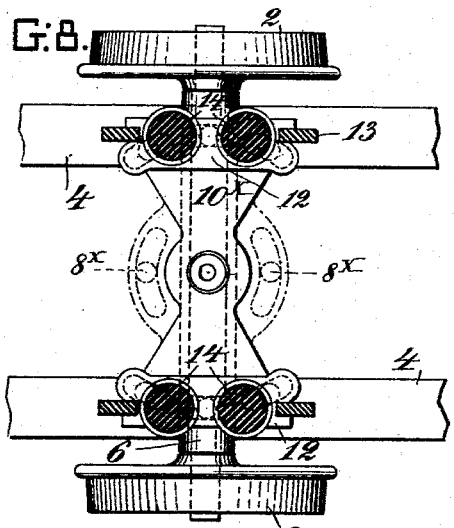
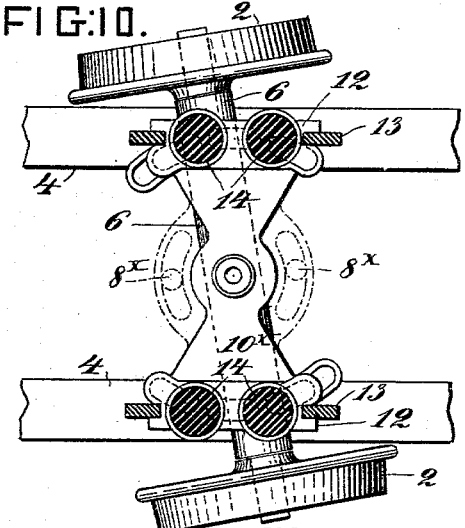
WITNESSES:
INVENTOR:
Charles F. Heath
By Henry Connett
Attorney.

UNITED STATES PATENT OFFICE.

CHARLES F. HEATH, OF JERSEY CITY, NEW JERSEY.

CAR-TRUCK.

SPECIFICATION forming part of Letters Patent No. 548,365, dated October 22, 1895.

Application filed March 23, 1895. Serial No. 542,883. (No model.)

*To all whom it may concern:*

Be it known that I, CHARLES F. HEATH, a citizen of the United States, and a resident of Jersey City, Hudson county, New Jersey, have invented certain new and useful Improvements in Car-Trucks, of which the following is a specification.

This invention relates to the class of car-trucks so pivoted that the axle of each pair of wheels thereof will occupy a radial or nearly radial position with respect to the curve when the truck is moving on a curved track and which has means for bringing the axles to their normal positions at right angles to the truck axis when the truck moves onto a curved track.

The object of the invention is to improve the rolling bearings of the truck and to improve the construction of the truck in a manner to lessen the liability to breakage, and thus increase its durability.

The invention will be fully described hereinafter with reference to the accompanying drawings, and its novel features carefully defined in the claims.

In the said drawings, Figure 1 is a transverse vertical section of a truck embodying my invention. Fig. 2 is a side elevation showing the mountings of one truck-axle, the near wheel being removed, and the axle in section on line $x^2$ in Fig. 1. Fig. 3 is a sectional plan, the horizontal plane of the section being indicated by line $x^3 x^3$ in Fig. 2. These three views show the positions of the parts when the truck is on a straight track. Figs. 4 and 5 are views of the truck corresponding to Figs. 2 and 3, respectively, but showing the positions of the parts when the truck is on a sharply-curved track. Figs. 6, 7, 8, 9, and 10 are views corresponding to Figs. 1, 2, 3, 4, and 5, respectively, and illustrating slightly different embodiments of the invention, which will be hereinafter described.

Referring primarily to the first five figures of the drawings, 1 represents the axle, 2 the flanged wheels thereon, and 3 the track-rails. These latter may be of any approved form suitable for straight and curved tracks.

4 is the truck-frame, which may be of wood or metal. The manner of mounting the truck-frame on the axles will now be described.

5 5 are bearing-boxes, which rest on the axle adjacent to the wheel-hubs. These boxes are connected by a tie or bridge 6, which may be cast integrally with the boxes. Preferably this tie will be semicircular in cross-section, and it will be raised slightly above and out of contact with the axle. On each box 5, and formed, by preference, integrally therewith, is a ball-support 7, recessed to receive balls 8, as clearly shown in Figs. 1 and 2, the latter view being broken away at the left to show the recesses and ball in full lines.

On the tie or bridge 6 at its middle is an erect pintle 9, which has a bearing in the boss of a four-armed frame 10, which arms have socket-bearings at 11, Figs. 3 and 5, in spring-bars 12 12. Each spring-bar 12 is slotted at its ends and has bearings on the two uprights 13 of a spring-frame fixed on the truck-frame. The springs 14 are arranged between the spring-bar 12 and the transverse bar $13^\times$ of the spring-frame. The spring-bar is recessed on its under side, and the balls 8 are situated in the recesses and between the ball-support 7 and the spring-bar. As shown in the first five figures of the drawings, there are two balls under each spring-bar 12, and each ball occupies a separate ball-recess, and in these views also the ball-recesses are made deepest at the middle of their lengths, becoming shallower toward their ends. The object of this construction is illustrated in Figs. 4 and 5. When the truck moves onto a curved track, the ball-support 7 moves under the spring-bar 12, swinging in a curve about the pintle 9, and causes the balls to roll in their recesses in such a manner that they occupy the shallower parts of the said recesses, thus raising the spring-bar slightly; but when the truck moves onto a straight track the axles will again right themselves through the tendency of the balls to roll again to the deeper central points in the recesses. The weight or pressure on the balls will suffice to produce this result.

In Figs. 2 and 4 I have represented the ball-recesses (15 in Fig. 2) in both the spring-bar and the ball-support as deepest at the middle of their lengths, but a good result may be obtained if either one of said recesses be made of uniform depth. For example, in Fig. 7, I have shown the lower ball-recess, the one in the ball-support, as having a uniform depth.

The construction illustrated in Figs. 6 to 10 differs from that already described in the respects I will now designate. The frame 10$^x$, which connects the spring-bars 12, is formed integrally therewith, instead of having four arms, the tips or ends of which have bearings in sockets in the spring-bars. This latter construction (illustrated in the first five figures) is preferred, as it tends by providing against too much rigidity to increase the durability of the structure, which is sometimes subjected to sudden strains tending to distort it.

Another feature of difference lies in the use of three balls instead of two. This gives a somewhat broader rolling bearing than the construction first described, but I prefer the latter construction as affording sufficient bearing and being the least expensive. One centrally-arranged ball (like the central ball in Fig. 7) might be used alone under each spring-bar; but in that case I employ balls arranged as indicated in dotted lines at 8$^x$ in Figs. 8 and 10—that is to say, oppositely-arranged ball-supports are formed by lateral extensions on the bridge or tie 6, connecting the bearing-boxes 5, and over them are arranged lateral extensions on the frame 10$^x$. Suitable ball-recesses (indicated in dotted lines) are formed in these extensions to receive the balls 8$^x$. This construction provides a rolling side support near the pintle. I have not deemed it necessary to encumber the drawings with a separate illustration of this use of the balls 8$^x$, as they may be used in connection with one, two, or more balls under the respective spring-bars, and so they are adapted to all the constructions shown.

I have shown the variation in the depth of the ball-recess on an exaggerated scale in the drawings, so that it may be seen the more easily. In practice this difference of depth does not exceed one-eighth of an inch on a full-sized truck. Hence the rise of the frame 10 on the pintle 9 will be very slight when the truck is on a curve in the track and both ends will rise equally, or substantially so. However, the pintle is made to fit somewhat loosely in its bearing, so that the frame may rock slightly on the pintle. Indeed the parts which move the one on the other are not fitted snugly together.

Having thus described my invention, I claim—

1. The combination, with the truck-frame furnished with spring-frames and springs, of the axles and wheels thereon, the axle-bearing boxes connected by a tie and provided with ball-supports, the said tie being provided with a pintle, the spring-bars mounted in the spring-frames over the respective ball-supports, the transverse frame, pivoted on the pintle and connected at its ends to the respective spring-bars, and balls between the respective ball-supports and spring-bars and occupying recesses in the same, substantially as set forth.

2. The combination, with the truck-frame furnished with spring-frames and springs, of the axles and wheels thereon, the axle-bearing boxes connected by a tie and provided with ball-supports, the said tie being provided with a pintle, the spring-bars mounted in the spring-frames over the respective ball-supports, the transverse, four-armed frame 10, pivoted on said pintle, the extremities of the arms of said frame having socket-bearings in the respective spring-bars, and the balls between the respective ball-supports and spring-bars and occupying recesses in the same, substantially as set forth.

3. In a car-truck, the combination with the truck-frame having spring-frames, the axle, the wheels thereon, and the springs, of the bearing-boxes connected by a tie or bridge, the spring-bars, mounted in the spring-frame, and connected by a transverse frame, said frame being pivoted on the bridge which connects the bearing-boxes, and bearing-balls arranged between the respective spring-bars and ball-supports on the bearing-boxes, said balls occupying recesses in the said supports and bars, substantially as set forth.

In witness whereof I have hereunto signed my name in the presence of two subscribing witnesses.

CHARLES F. HEATH.

Witnesses:
JAS. KING DUFFY,
HENRY CONNETT.